(12) United States Patent
Takehira et al.

(10) Patent No.: US 9,462,639 B2
(45) Date of Patent: Oct. 4, 2016

(54) INDUCTION HEATING COOKER

(75) Inventors: Takashi Takehira, Hyogo (JP);
Fumitaka Ogasawara, Hyogo (JP);
Masashi Kinoshita, Hyogo (JP); Yuji Yamamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1046 days.

(21) Appl. No.: 13/636,844

(22) PCT Filed: Jun. 10, 2011

(86) PCT No.: PCT/JP2011/003307
§ 371 (c)(1),
(2), (4) Date: Sep. 24, 2012

(87) PCT Pub. No.: WO2011/155221
PCT Pub. Date: Dec. 15, 2011

(65) Prior Publication Data
US 2013/0008891 A1 Jan. 10, 2013

(30) Foreign Application Priority Data

Jun. 10, 2010 (JP) .................................. 2010-132664

(51) Int. Cl.
*H05B 6/12* (2006.01)
*H05B 6/42* (2006.01)
*H05B 6/06* (2006.01)

(52) U.S. Cl.
CPC ............ *H05B 6/062* (2013.01); *H05B 6/1272* (2013.01); *Y02B 40/126* (2013.01)

(58) Field of Classification Search
CPC .. H05B 6/062; H05B 6/1272; H05B 6/1209; F24C 15/102; Y02B 40/126

USPC ................ 219/600, 618, 620, 622, 624–627, 219/660–677, 200, 385, 391, 438, 441, 482, 219/490, 497, 494; 99/324, 325, 330, 331, 99/332, 333, 342, 403
See application file for complete search history.

(56) References Cited

U.S. PATENT DOCUMENTS

2005/0247696 A1* 11/2005 Clothier ................. H05B 3/746
219/497
2006/0081607 A1* 4/2006 Niiyama ................ H05B 6/062
219/497

FOREIGN PATENT DOCUMENTS

| CN | 101014220 A | 8/2007 |
|---|---|---|
| JP | 2007-080752 A | 3/2007 |

(Continued)

OTHER PUBLICATIONS

Office Action in corresponding Canadian Application No. 2,792,540, dated Jun. 13, 2014, 3 pages.
Office Action and Search Report, and partial translation thereof, in corresponding Chinese Application No. 201180015065.8, dated Mar. 17, 2014, 7 pages.

(Continued)

*Primary Examiner* — Hung D Nguyen
(74) *Attorney, Agent, or Firm* — Brinks Gilson & Lione

(57) ABSTRACT

An induction heating cooker includes an inverter for supplying a current to a heating coil, a control portion for driving the inverter, an electrostatic capacitance detecting portion for measuring electrostatic capacitance of a plurality of electrodes, and a boiling over detecting portion. The boiling over detecting portion reduces an output of the inverter from a first set value to a second set value after a sensed value of the electrostatic capacitance is within a first variation range ($\Delta V1$) or more, and returns the output of the inverter to the first set value when a sensed value during a boiling over establishing period (T2) performed after the sensed value has reached the first variation range or more and falls within a second variation range ($\Delta V2$).

8 Claims, 6 Drawing Sheets

(56) References Cited

FOREIGN PATENT DOCUMENTS

| JP | 2007-207538 | A | | 8/2007 |
|----|-------------|---|---|--------|
| JP | 2008-159494 | A | | 7/2008 |
| JP | 2008159494 | A | * | 7/2008 |
| JP | 2010-97960 | A | | 4/2010 |

OTHER PUBLICATIONS

International Preliminary Report on Patentability for International Application No. PCT/JP2011/003307, dated Jan. 15, 2013, 4 pages.
International Search Report for International Application No. PCT/JP2011/003307, dated Aug. 2, 2011, 1 page.

* cited by examiner

INDUCTION HEATING COOKER

This application is a 371 application of PCT/JP2011/003307 having an international filing date of Jun. 10, 2011, which claims priority to JP2010-132664 filed Jun. 10, 2010, the entire contents of which are incorporated herein by reference.

TECHNICAL FIELD

The present invention relates to an induction heating cooker, and more particularly, to an induction heating cooker having a boiling over sensing function for sensing boiling over of a cooking container such as a pan during cooking.

BACKGROUND ART

According to a conventional induction heating cooker, a plurality of electrodes are provided around an outer periphery of a heating coil and the boiling over is sensed based on a change in electrostatic capacitance of the electrodes as described in Unexamined Japanese Patent Publication No. 2008-159494 (Patent Literature 1).

FIG. 7 is a view showing a configuration of the conventional induction heating cooker disclosed in Patent Literature 1. FIG. 8 is a graph showing a change in electrostatic capacitance in the electrodes used for sensing the boiling over described in Patent Literature 1.

As shown in FIG. 7, the conventional induction heating cooker is provided with a drive circuit 102 for inputting a low-frequency power from an AC power supply 101 and supplying a high-frequency power to a heating coil 104 to heat a cooking container (not shown) by induction. In addition, a plurality of electrodes 103 each having a shape of a small circular plate are concentrically dispersed around the outer periphery of the heating coil 104. Each of the dispersed electrodes 103 is connected to an electrostatic capacitance measuring circuit 106. The electrostatic capacitance measuring circuit 106 detects electrostatic capacitance between the electrode 103 and the electrostatic capacitance measuring circuit 106. Hereinafter, this electrostatic capacitance is simply referred to as "electrostatic capacitance of the electrode 103". The electrostatic capacitance of the electrode 103 depends on arrangements of a dielectric body (such as a top plate) and a conductive body (such as a metal cooking container or the heating coil 104) provided around the electrode 103. According to the conventional induction heating cooker configured as described above, after liquid has boiled over from an edge part of the cooking container such as a pan set on the heating coil 104 with the top plate interposed between them, the spilt liquid exists on any of the electrodes 103 or in a neighborhood of it. When the spilt liquid exists, the electrostatic capacitance of any of the electrodes 103 increases. The boiling over is sensed by sensing the increase in electrostatic capacitance. When the boiling over occurs on the any of the electrodes 103 or in the neighborhood of it, water exists between the electrode 103 and the cooking container or the heating coil 104, so that the electrostatic capacitance between the heating coil 104 and the electrode 103 abruptly increases. Therefore, the boiling over can be sensed by sensing the electrostatic capacitance of the electrode 103 as described above.

According to the conventional induction heating cooker, when the phenomenon that the electrostatic capacitance of the electrode 103 abruptly increases is detected (refer to FIG. 8), the control circuit 105 determines it as the boiling over, and stops an action of the drive circuit 102, or reduces the high-frequency current flowing to the heating coil 104.

PLT 1: Unexamined Japanese Patent Publication No. 2008-159494

SUMMARY OF THE INVENTION

Technical Problem

As described above, with the electrodes 103 dispersed around the outer periphery of the heating coil 104, the boiling over can be sensed by sensing its electrostatic capacitance, but the problem is that the change in electrostatic capacitance of the electrode is not a phenomenon caused only by the boiling over. For example, when a user puts something containing water such as a wet kitchen cloth on the top plate near the electrode 103, the electrostatic capacitance sensed in the electrode 103 considerably changes. In addition, in a case where the user shifts a position of the cooking container or a case where the user touches the top plate, the electrostatic capacitance sensed in the electrode 103 also changes. Thus, even in a case where the boiling over does not occur, the conventional induction heating cooker determines it as the boiling over, and stops the action of the drive circuit 102, or reduces the current of the heating coil 104, so that the cooker is not user-friendly.

As described above, according to the configuration of the conventional induction heating cooker, the boiling over is always determined when the electrostatic capacitance increases by a predetermined value or more, so that even in a case of an increase in electrostatic capacitance caused not by the boiling over, that is, electrostatic capacitance fluctuation which could be generated during the normal cooking such as a case where it is touched by a kitchen cloth or a hand, a case where a pan is stirred with a metal ladle, or a case where the pan is shifted on the electrode, the drive circuit is stopped or the high-frequency current is reduced, which makes it difficult for the user to continue the cooking during the normal cooking.

The present invention has been made to solve the above problems of the conventional induction heating cooker, and it is an object of the present invention to provide an induction heating cooker capable of preventing a phenomenon that boiling over is erroneously sensed due to the fluctuation of the electrostatic capacitance which could occur during cooking and an action of a drive circuit is stopped or a high-frequency current is reduced, and sensing the boiling over with high precision.

Solution to Problem

An induction heating cooker in a first aspect in the present invention includes
a top plate for setting a cooking container,
a heating coil provided under the top plate, for heating the cooking container by induction,
an inverter for supplying a high-frequency current to the heating coil,
an electrode provided on a back surface of the top plate in a neighborhood of a circumference of the heating coil,
an electrostatic capacitance detecting portion for supplying a high-frequency current to the electrode and sensing electrostatic capacitance of the electrode,
a memory portion for storing a reference value for measuring a variation of the electrostatic capacitance, a control portion for controlling an output of the inverter so that the output becomes a first set value set by an output setting portion, and a boiling over detecting portion for switching to a second set value lower than the first set value after a sensed value of the electrostatic capacitance with respect to the reference value reaches a range of a first variation or more, during an action performed under a condition that the output of the inverter is set in the first set value, wherein the boiling over detecting portion returns the output of the inverter to the first set value in a case where the sensed value falls within a range of a second variation during a boiling over establishing period set after the sensed value reaches the first variation or more.

According to the induction heating cooker in the first aspect configured as described above, after the sensed value of the electrostatic capacitance measured by the electrostatic capacitance detecting portion serving as an electrostatic capacitance measuring means has reached the range of the first variation or more, the heating is reduced to the second heating output lower than the first heating output to prevent the boiling over, and in the case where the sensed electrostatic capacitance is continued to be within the range of the second variation during the predetermined boiling over establishing period, it is determined that the boiling over does not occur, and heating is continued or restarted.

According to the induction heating cooker in the first aspect, it becomes possible to prevent the erroneous sensing of the boiling over due to the fluctuation of the electrostatic capacitance which could occur during the cooking, so that the user can continue cooking and usability is improved.

According to the induction heating cooker in a second aspect in the present invention, the boiling over detecting portion in the first aspect performs a reference value updating process to replace the reference value with the electrostatic capacitance sensed after elapse of a reference value sensing period, after a state in which the sensed value of the electrostatic capacitance falls within a range of a reference value update variation smaller than the first variation has continued for the reference value sensing period, and prohibits the reference value updating process after the variation has reached the reference value update variation or more, returns the output of the inverter to the first set value, and resume the reference value updating process in a case where the sensed value in the boiling over establishing period set after the reference value updating process has been prohibited falls within the range of the second variation.

According to the induction heating cooker in the second aspect configured as described above, it becomes possible to surely prevent the erroneous sensing of the boiling over due to the fluctuation of the electrostatic capacitance which could occur during the cooking, so that the user can continue cooking and the heating output is not unnecessarily reduced or stopped due to the erroneous sensing of the boiling over, which is user-friendly.

According to the induction heating cooker in a third aspect in the present invention, the boiling over detecting portion in the first aspect or the second aspect starts to count a time of the boiling over establishing period after elapse of a boiling over determining period started after the sensed value of the electrostatic capacitance has reached the range of the first variation or more.

According to the induction heating cooker in the third aspect configured as described above, the boiling over is surely sensed by the fluctuation of the electrostatic capacitance which could occur during the cooking, and the boiling over is prevented from being erroneously sensed, which is user-friendly.

According to the induction heating cooker in a fourth aspect in the present invention, the boiling over detecting portion in the first aspect includes a memory portion, and the memory portion stores a maximum value of the sensed value of the electrostatic capacitance during the boiling over establishing period, and it is determined whether or not the maximum value falls within the range of the second variation by comparing the maximum value with the range of the second variation.

According to the induction heating cooker in the fourth aspect configured as described above, the boiling over is surely sensed by the fluctuation of the electrostatic capacitance which could occur during the cooking, and the boiling over is prevented from being erroneously sensed.

According to the induction heating cooker in a fifth aspect in the present invention, the boiling over detecting portion in the first aspect is configured to return the output of the inverter to the first set value when the sensed value of the electrostatic capacitance reaches the range of the second variation or more, and reaches a variation value or more set by adding a predetermined value to the sensed value of the electrostatic capacitance after the elapse of the boiling over determining period, during the boiling over establishing period.

According to the induction heating cooker in the fifth aspect configured as described above, it becomes possible to surely prevent the erroneous sensing of the boiling over due to the fluctuation of the electrostatic capacitance which could occur during the cooking, and the user can continue cooking.

According to the induction heating cooker in a sixth aspect in the present invention, the boiling over detecting portion in the first aspect stops a heating action of the inverter or reduces the output of the inverter to a third set value lower than the second set value when the sensed value of the electrostatic capacitance reaches the range of the second variation or more, and is less than a variation value set by adding a predetermined value to the sensed value of the electrostatic capacitance after the elapse of the boiling over determining period, during the boiling over establishing period.

According to the induction heating cooker in the sixth aspect configured as described above, it becomes possible to surely prevent the erroneous sensing of the boiling over due to the fluctuation of the electrostatic capacitance which could occur during the cooking, and the user can continue cooking, and when the boiling over is sensed, the heating output is reduced or stopped, so that the flavoring liquid can be prevented from spreading on the top plate, and it is convenient for the user to take care of it.

According to the induction heating cooker in a seventh aspect in the present invention, the induction heating cooker in the first aspect further includes an alarm portion, and the control portion makes the alarm portion generate an alarm when the boiling over is sensed.

According to the induction heating cooker in the seventh aspect configured as described above, it becomes possible to surely prevent the erroneous sensing of the boiling over due to the fluctuation of the electrostatic capacitance which could occur during the cooking, and when the boiling over is sensed, it becomes possible to inform the user of the fact, so that the flavoring liquid can be prevented from spreading on the top plate in an early stage.

Advantageous Effects of the Invention

According to the present invention, it becomes possible to provide an induction heating cooker capable of preventing the phenomenon that boiling over is erroneously sensed due to the fluctuation of the electrostatic capacitance which could occur during cooking and the action of the drive circuit is stopped or the high-frequency current is reduced, and sensing the boiling over with high precision.

DETAILED DESCRIPTION OF THE PREFERRED EMBODIMENTS

Hereinafter, a specific embodiment according to an induction heating cooker in the present invention will be described with reference to the accompanied drawings. In addition, the present invention is not limited to a specific configuration described in the following embodiment, and it includes a configuration provided based on a technical idea similar to a technical idea which will be described in the embodiment, and technical common knowledge in the art.

First Embodiment

Figure 1:
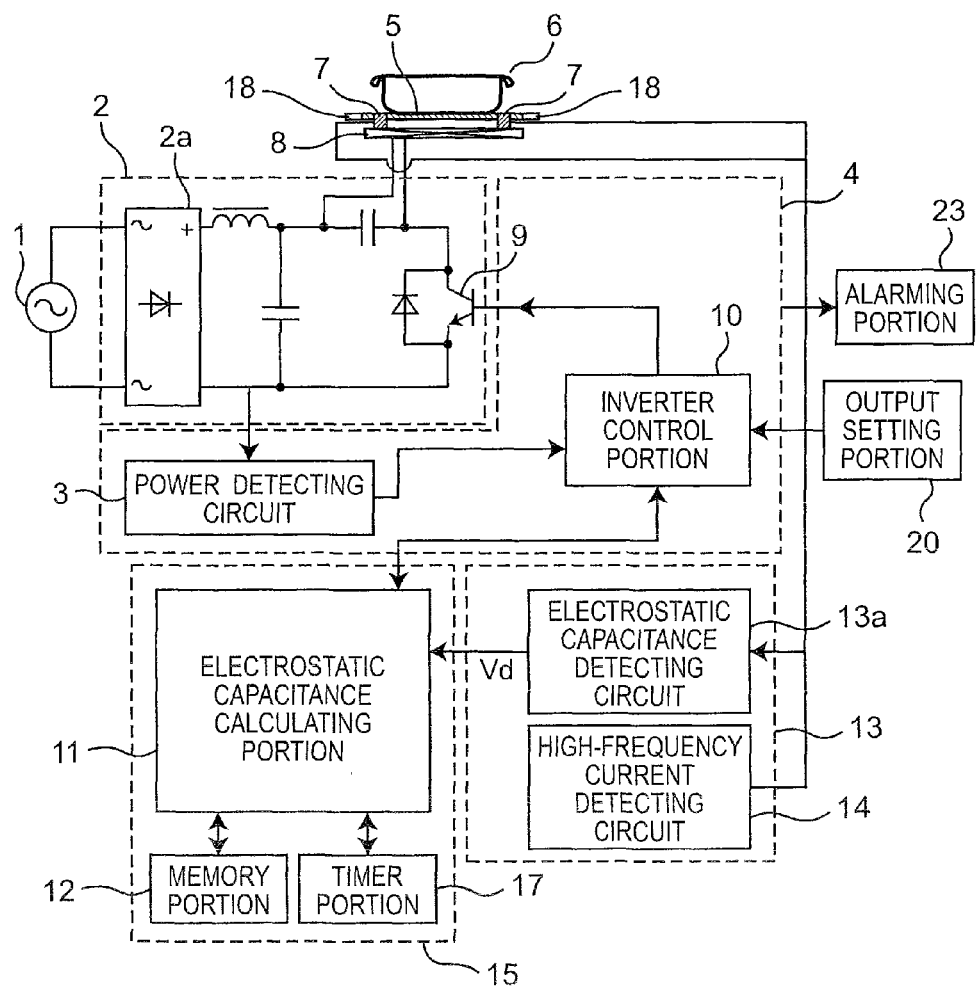
FIG. 1 is a block diagram showing a configuration of an induction heating cooker in a first embodiment according to the present invention.

FIG. 1 is a block diagram showing a configuration of an induction heating cooker in a first embodiment according to the present invention.

Referring to FIG. 1, the induction heating cooker in the first embodiment has a top plate (top panel) 5 on which a cooking container 6 is set, a heating coil 8 provided under the top plate 5 to heat the cooking container 6 by induction, an inverter 2 for supplying a high-frequency current to the heating coil 8 so that a predetermined heating output is provided, a control portion 4 for driving the inverter 2 while sensing a heating coil current (high-frequency current) corresponding to the heating output of the inverter 2, a plurality of electrodes 7 formed of a material having preferable conductivity and printed into a band-shaped pattern on a back surface of the top plate 5 (opposite surface of the surface on which the cooking container 6 is set in FIG. 1), an electrostatic capacitance detecting portion 13 for supplying a high-frequency signal to the electrodes 7 and sensing a change in electrostatic capacitance of the electrode 7, and a boiling over detecting portion 15 for sensing boiling over based on a signal (Vd) from the electrostatic capacitance detecting portion 13, controlling the inverter 2, and determining the boiling over. The electrodes 7 are provided so as to surround a neighborhood of a periphery of the heating coil 8.

The inverter 2 is provided with a rectifying element 2a, an inverter switching element 9, an inductor, and a capacitor in order to form a desired high-frequency current based on a power from an AC power supply 1. The control portion 4 for driving the inverter 2 is provided with a power detecting circuit 3 for detecting a power of the inverter 2, and an inverter control portion 10.

The electrostatic capacitance detecting portion 13 is provided with an electrostatic capacitance detecting circuit 13a for detecting electrostatic capacitance of the electrode 7, and a high-frequency current supply circuit 14 for supplying a high-frequency current to the electrode 7. The boiling over detecting portion 15 is provided with an electrostatic capacitance calculating portion 11 for calculating a variation of electrostatic capacitance, based on the electrostatic capacitance value detected by the electrostatic capacitance detecting circuit 13a, and an electrostatic capacitance reference value, a memory portion 12 for storing the calculated electrostatic capacitance, and a timer portion 17 for measuring a predetermined time. The electrostatic capacitance calculating portion 11 counts an elapsed time to detect the electrostatic capacitance, based on a signal from the timer portion 17.

The electrostatic capacitance detecting circuit 13a of the electrostatic capacitance detecting portion 13 receives a voltage obtained from the high-frequency current supplied from the high-frequency current supply circuit 14 to the electrode 7, and detects the electrostatic capacitance in the electrode 7.

Figure 2:
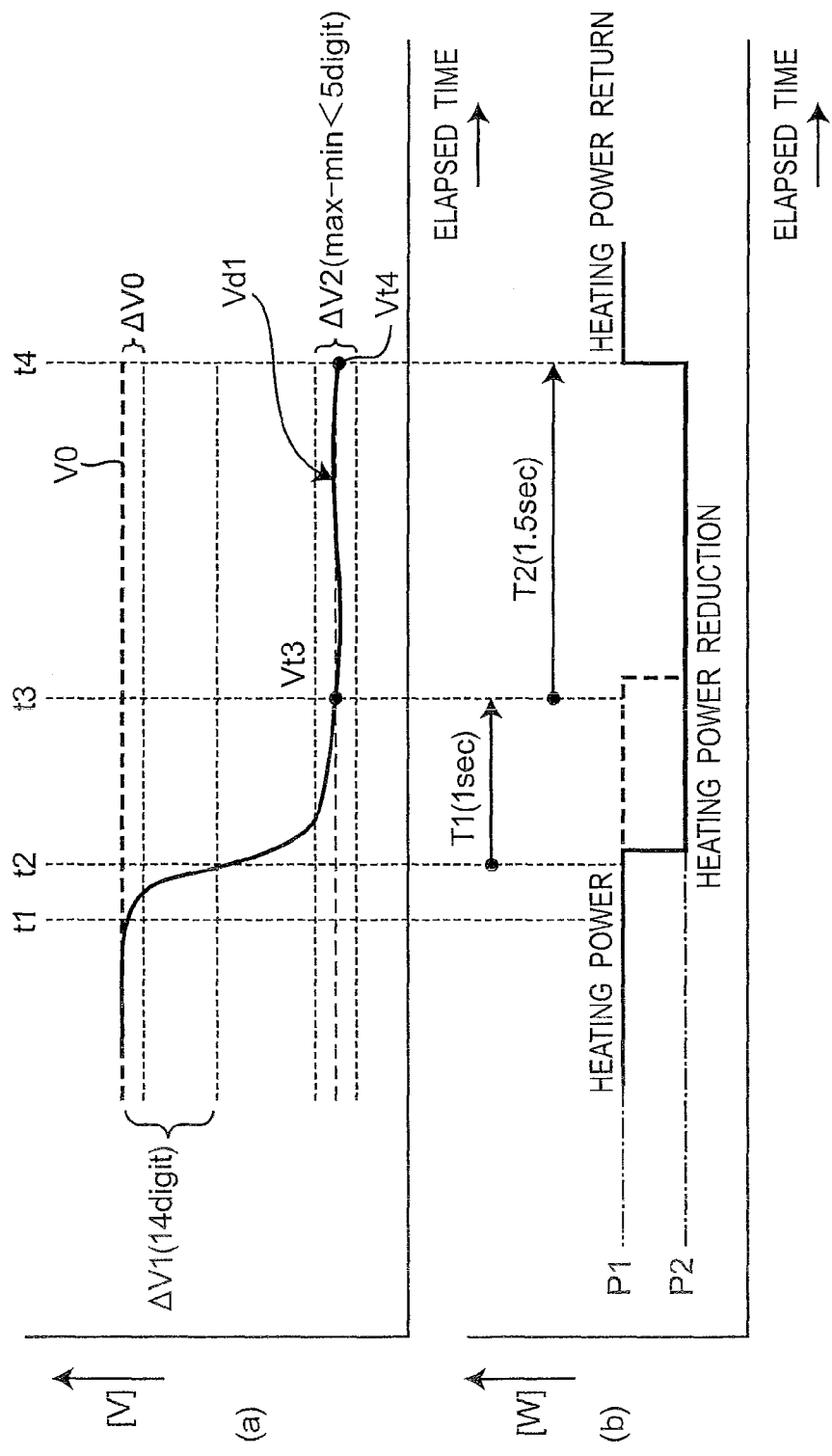
FIG. 2 is a waveform diagram showing one example of an electrostatic capacitance sensing signal (a) not showing boiling over detected in the induction heating cooker in the first embodiment, and a heating output (b) outputted from an inverter.

FIG. 2 shows one example of a detected electrostatic capacitance sensing signal ((a) of FIG. 2), and a heating output outputted from the inverter 2 ((b) of FIG. 2) in the induction heating cooker in the first embodiment. Thus, (a) of FIG. 2 is a waveform diagram showing one example of an electrostatic capacitance sensing signal Vd (showing a case where the boiling over is not determined) inputted from the electrostatic capacitance detecting portion 13 to the boiling over detecting portion 15, and in (a) of FIG. 2, a longitudinal axis shows a voltage [V] of the electrostatic capacitance sensing signal Vd, and a lateral axis shows an elapsed time. In addition, (b) of FIG. 2 shows a relationship between the electrostatic capacitance sensing signal Vd shown in (a) of FIG. 2, and a heating output [W] from the inverter 2. The electrostatic capacitance detecting portion 13 senses the electrostatic capacitance of the electrode 7, and outputs the electrostatic capacitance sensing signal Vd corresponding to its amount. Thus, (a) of FIG. 2 shows a case where the electrostatic capacitance sensing signal Vd is reduced due to an increase in electrostatic capacitance of any of the electrodes 7.

The electrostatic capacitance calculating portion 11 calculates the electrostatic capacitance variation value and electrostatic capacitance reference value, and executes a reference value updating process to update a reference value V0 at predetermined intervals in a normal cooking state in which the boiling over is not generated while the heating of the inverter 2 outputs the predetermined heating output (first heating output P1). According to the first embodiment, when a sensed value (electrostatic capacitance) shown by the electrostatic capacitance sensing signal Vd detected after elapse of a reference value sensing period T0 (such as one second) falls within a range of a previously set reference value update variation ΔV0 (not including a boundary value), an average value of the sensed values shown by the electrostatic capacitance sensing signals Vd in the reference value sensing period T0 is updated as a new reference value V0. Alternatively, the sensed value shown by the electrostatic capacitance sensing signal Vd detected just before the end of the reference value sensing period T0 may be used as the new reference value V0.

As shown in (a) of FIG. 2, when an electrostatic capacitance sensing signal Vd1 showing the sensed electrostatic capacitance is changed by a first variation ΔV1 or more (including a boundary value) (ΔV1>ΔV0) with respect to the reference value V0 set at that time (time t2), the heating is reduced to a second heating output P2 (second set value) which is lower than the previous first heating output P1 (first set value) serving as the heating output at the time of the normal cooking. Thus, the switching action to the lower second heating output P2 may be carried out just after the electrostatic capacitance sensing signal Vd1 has been changed by the range of the first variation ΔV1 or more (ΔV1>ΔV0), or it may be carried out after a predetermined period to determine the boiling over, such as 1.5 to 2 seconds. Thus, by reducing the heating state to the second heating output P2, the boiling over can be prevented in the case where the boiling over is generated.

When the electrostatic capacitance sensing signal Vd1 is changed by the range of the first variation ΔV1 or more (time t2), a boiling over determining period T1 (such as one second) serving as a "first boiling over determining period" is started, and the boiling over determining period T1 is measured by the timer portion 17. After elapse of the boiling over determining period T1 (such as one second), a sensed value Vt3 of the electrostatic capacitance sensing signal Vd1 showing the electrostatic capacitance detected at that time is stored in the memory portion 12.

After a boiling over establishing period T2 (such as 1.5 seconds) serving as a "second boiling over determining period" which starts at the end (t3) of the determining period T1 serving as the "first boiling over determining period", in a case where a sensed value Vt4 of the electrostatic capacitance sensing signal Vd1 at that time falls within a range of a second variation ΔV2 (less than 5 digit) (not including a boundary point) having a range around the stored sensed value Vt3, a boiling over process to stop the heating output is not performed, and the first heating output P1 (first set value) is returned from the second hearing output P2 (second set value), so that the cooking is continued. Meanwhile, in a case where the sensed value Vt4 of the electrostatic capacitance sensing signal Vd1 is beyond the range of the second variation ΔV2, that is, it is out of the range of the second variation ΔV2 (including the boundary value), the boiling over process is performed such that the heating output is set lower than the second heating output, or the heating output is stopped.

In addition, the above "digit" means a minimum portion of a digital display of a voltage or a time, and "1 digit" means about 19.5 mV in the first embodiment. In addition, the range of the second variation ΔV2 may be provided around the sensed value Vt3 such that the same range width is provided across the sensed value Vt3, or upper and lower variations may be different across it.

As described above, according to the induction heating cooker in the first embodiment, in the case where the state similar to the boiling over sensed during the cooking is determined as the boiling over, based on the sensed value shown by the detected electrostatic capacitance sensing signal Vd, the heating action is stopped, or the heating action is reduced, while in the case where the sensed state similar to the boiling over is determined as not the boiling over, the heating action is started again. In addition, when a configuration is provided such that the heating output is reduced from the first heating output P1 to the second heating output P2 just before the elapse of the boiling over establishing period T2 serving as the "second boiling over determining period", in a case where it is determined that the boiling over does not occur during the boiling over establishing period T2, the heating action is substantially continued.

In addition, according to the induction heating cooker in the first embodiment, the reference value V0 is previously set in the memory portion 12 as a threshold value, and the electrostatic capacitance value calculating portion 11 calculates an average value of the sensed values of the plurality of electrostatic capacitance sensing signals Vd detected for the predetermined reference value sensing period T0 (such as one second) measured by the timer portion 17, and sequentially sets the average value as the new reference value V0 and stores it in the memory portion 12. Thus, the induction heating cooker in the first embodiment is configured such that the reference value is sequentially updated, and when the detected electrostatic capacitance sensing signal Vd reaches the first variation ΔV1 or more, the predetermined boiling over determining period is started, and the boiling over is determined based on the detected electrostatic capacitance variation.

A description will be given of an action in the induction heating cooker in the first embodiment configured as described above.

During the cooking on the induction heating cooker in the first embodiment, the predetermined power is supplied to the heating coil 8 from the inverter 2 to which the AC power is inputted from the AC power supply 1, and the cooking container 6 set on the top plate 5 is heated. When the cooking container 6 boils over while the cooking container 6 is heated, a liquid such as water or flavoring liquid spills over the top plate 5. As a result, the spilt liquid enters a space between the electrode 7 provided on the back surface of the top plate 5 and the cooking container 6, or the electrode 7 and a casing frame (earth) 18 provided around an outer edge of the top plate 5 and connects them, so that the electrostatic capacitance is increased to be more than that in the normal cooking.

When the electrostatic capacitance is increased, an input voltage to the electrostatic capacitance detecting circuit 13a is reduced, the sensed value of the electrostatic capacitance sensing signal Vd outputted to the electrostatic capacitance calculating portion 11 is also reduced. After the sensed value of the electrostatic capacitance sensing signal Vd showing the electrostatic capacitance with respect to the reference value V0 is changed by the predetermined first variation ΔV1 or more, or after a predetermined time (such as after 1.5 seconds) from when the sensed value of the electrostatic capacitance sensing signal Vt with respect to the reference value V0 is changed by the first variation ΔV1 or more, the heating output is reduced from the first heating output P1 (first set value) to the second heating output P2 (second set value) (P1>P1). In addition, when the sensed value of the electrostatic capacitance sensing signal Vd is changed by the range of the first variation ΔV1 or more, the boiling over determining period T1 starts, and the timer portion 17 starts counting the elapsed time. After the elapse of the boiling over determining period T1, the sensed value Vt3 of the electrostatic capacitance sensing signal Vd showing the electrostatic capacitance at that time is stored in the memory portion 12. Then, after the elapse of the boiling over determining period T1, the boiling over establishing period T2 serving as the "second boiling over determining period" is started, and the sensed value Vt4 of the electrostatic capacitance sensing signal Vd showing the electrostatic capacitance at the time after the elapse of the boiling over establishing period T2 is compared with the sensed value Vt3 in the "first boiling over determining period" stored at that time. When the sensed value Vt4 at this time falls within the range of the second variation ΔV2 provided around the sensed value Vt3, it is determined that the boiling over does not occur, and the boiling over process to stop the heating is not performed. As described above, the boiling over sensing action in the induction heating cooker in the first embodiment determines the boiling over state, based on the variation of the electrostatic capacitance at the time of cooking, with a high degree of accuracy.

As for the electrostatic capacitance sensing signal Vd1 shown in (a) of FIG. 2, and the heating outputs P1 and P2, the waveform shows the case where the boiling over process is not carried out at the time of the stable cooking in the boiling over sensing action in the induction heating cooker in the first embodiment.

In the case where the electrostatic capacitance sensing signal Vd1 having the waveform shown in FIG. 2 is inputted to the electrostatic capacitance calculating portion 11, when the sensed value at that time with respect to the reference value V0 reaches the first variation ΔV1 or more, the heating output is reduced from the first heating output P1 (first set value) to the second heating output P2 (second set value), the boiling over is prevented in the case where the boiling over occurs, and the sensed value Vt3 showing the electrostatic capacitance after the elapse of the boiling over determining period T1 is stored in the memory portion 12. After the elapse of the boiling over establishing period T2 started after the end of the boiling over determining period T1, in a case where the sensed value Vt4 showing the electrostatic capacitance at that time falls within the range of the second variation ΔV2 provided around the stored sensed value Vt3, the boiling over process is not carried out, and the heating is returned to the predetermined heating output P1 (first set value), or the heating output is substantially continued.

According to the induction heating cooker in the first embodiment configured as described above, a state different from the boiling over such as a state in which the cooking container 6 is slid on the top plate 5, or a state in which a wet kitchen cloth is temporarily put on the top plate 5 during the cooking is determined that it is not the state of the boiling over by the boiling over sensing action, so that the boiling over is prevented from being erroneously sensed. As a result, it becomes possible to prevent the phenomenon that the heating is unnecessarily stopped during the cooking because the boiling over is erroneously sensed, so that the cooking can be continued.

In addition, as the sensed value Vt3 of the electrostatic capacitance sensing signal Vd stored in the memory portion 12 after the elapse of the boiling over determining period T1 serving as the "first boiling over determining period", a maximum value or an average value of the electrostatic capacitance sensing signals Vd during the boiling over determining period T1 may be stored, and a method for sensing the boiling over and a control method in sensing the boiling over are not limited to the method described in the first embodiment.

Second Embodiment

Figure 3:
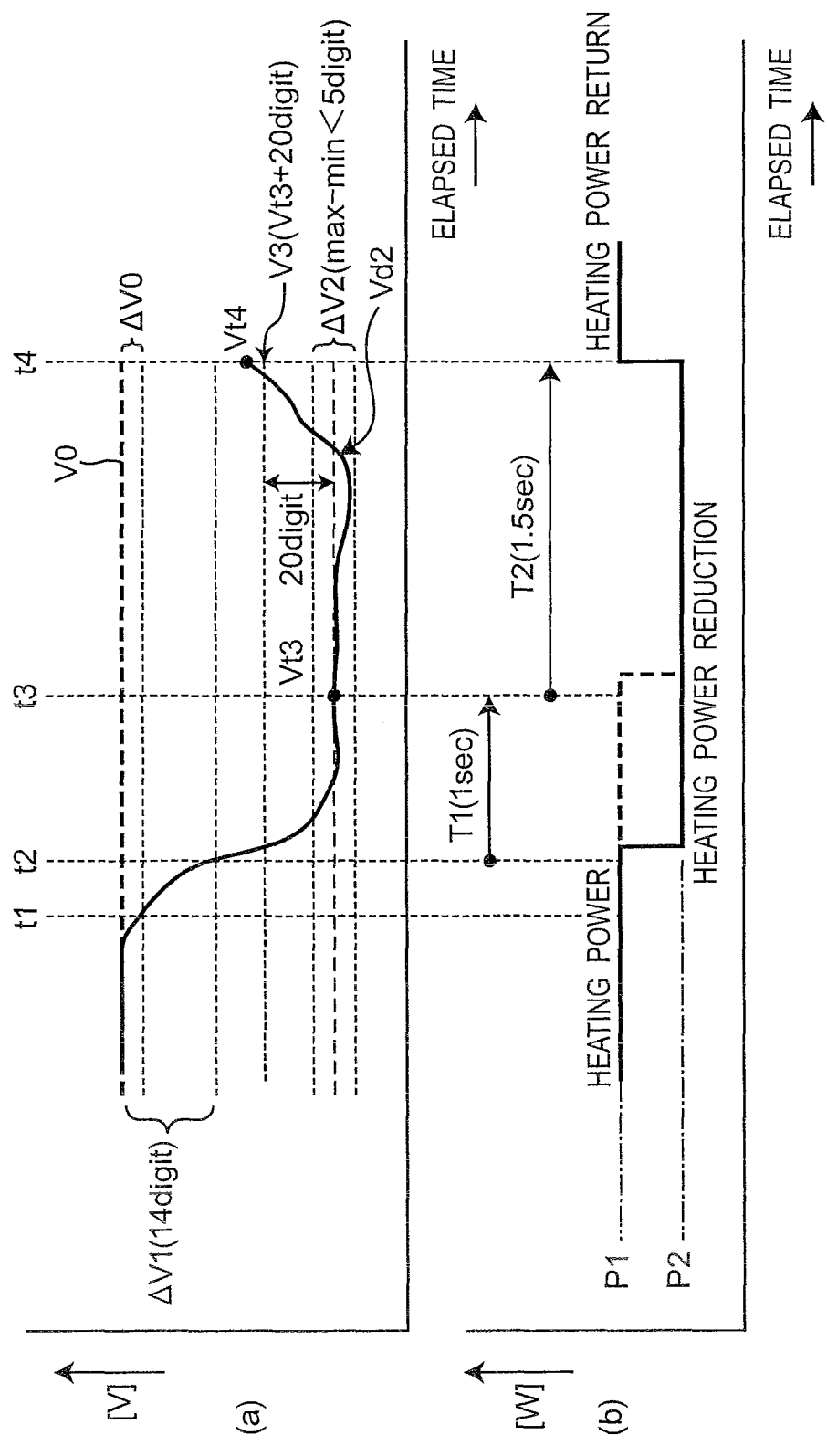
FIG. 3 is a waveform diagram showing one example of an electrostatic capacitance sensing signal (a) not showing boiling over detected in an induction heating cooker in a second embodiment, and a heating output (b) outputted from an inverter.

Next, an induction heating cooker in a second embodiment according to the present invention will be described with reference to accompanied FIG. 3. FIG. 3 shows one example of a detected electrostatic capacitance sensing signal Vd2 ((a) of FIG. 3), and a heating output outputted from an inverter ((b) of FIG. 3) in the induction heating cooker in the second embodiment of the present invention. In addition, the induction heating cooker in the second embodiment has the same basic configuration as that of the induction heating cooker in the first embodiment described above except for a method for sensing the boiling over. Therefore, a different point will be mainly described in the induction heating cooker of the following second embodiment, while the same reference signs are affixed to components having the same function and configuration as those of the induction heating cooker 1 in the first embodiment, and the description of the first embodiment is applied to it so that detailed description is omitted.

Thus, (a) of FIG. 3 shows a waveform diagram showing one example (the boiling over process is not performed) of the electrostatic capacitance sensing signal Vd2 inputted from the electrostatic capacitance detecting portion 13 to the boiling over detecting portion 15, and a longitudinal axis shows a voltage [V] of the electrostatic capacitance sensing signal Vd2, and a lateral axis shows an elapsed time in (a) of FIG. 3. In addition, (b) of FIG. 3 shows a relationship between the electrostatic capacitance sensing signal Vd2 shown in (a) in FIG. 3 and a heating output [W] from the inverter 2.

As for the boiling over sensing of the induction heating cooker in the second embodiment, a description will be given of a case where the electrostatic capacitance is largely fluctuated during the boiling over determining period (case where the boiling over process is not performed).

As shown in (a) of FIG. 3, in a case where the electrostatic capacitance sensing signal Vd2 showing the sensed electrostatic capacitance with respect to the reference value V0 set at that time is changed by the range of the first variation ΔV1 (ΔV1>ΔV0) or more, (at a point t2), the heating output at the time of cooking is reduced from the previous first heating output P1 (first set value) to the second heating output P2 (second set value) lower than the first heating output P1. Thus, by reducing the heating state to the second heating output P2, the boiling over is prevented in the case where the boiling over occurs. In addition, the sensed value Vt3 of the electrostatic capacitance sensing signal Vd2 showing the electrostatic capacitance detected after the elapse of the boiling over determining period T1 (such as one second) is stored in the memory portion 12. As described above, the action until the end of the boiling over determining period T1 is the same as that of the above first embodiment.

According to the induction heating cooker in the second embodiment, the sensed value Vt4 of the electrostatic capacitance sensing signal Vd2 showing the electrostatic capacitance after the elapse of the boiling over establishing period T2 (such as 1.5 seconds) (at a point t4) which started after the elapse of the boiling over determining period T1 is compared with a threshold value (third variation value V3) provided by adding a predetermined value (such as 20 digit) to the stored sensed value Vt3. At the point t4, in a case where the electrostatic capacitance is reduced, the detected electrostatic capacitance sensing signal Vd2 is increased and the sensed value Vt4 becomes higher than the third variation value V3 serving as the threshold value, it is determined that the boiling over does not occur, and the heating output is returned from the second heating output P2 (second set value) to the first heating output P1 (first set value).

Figure 4:
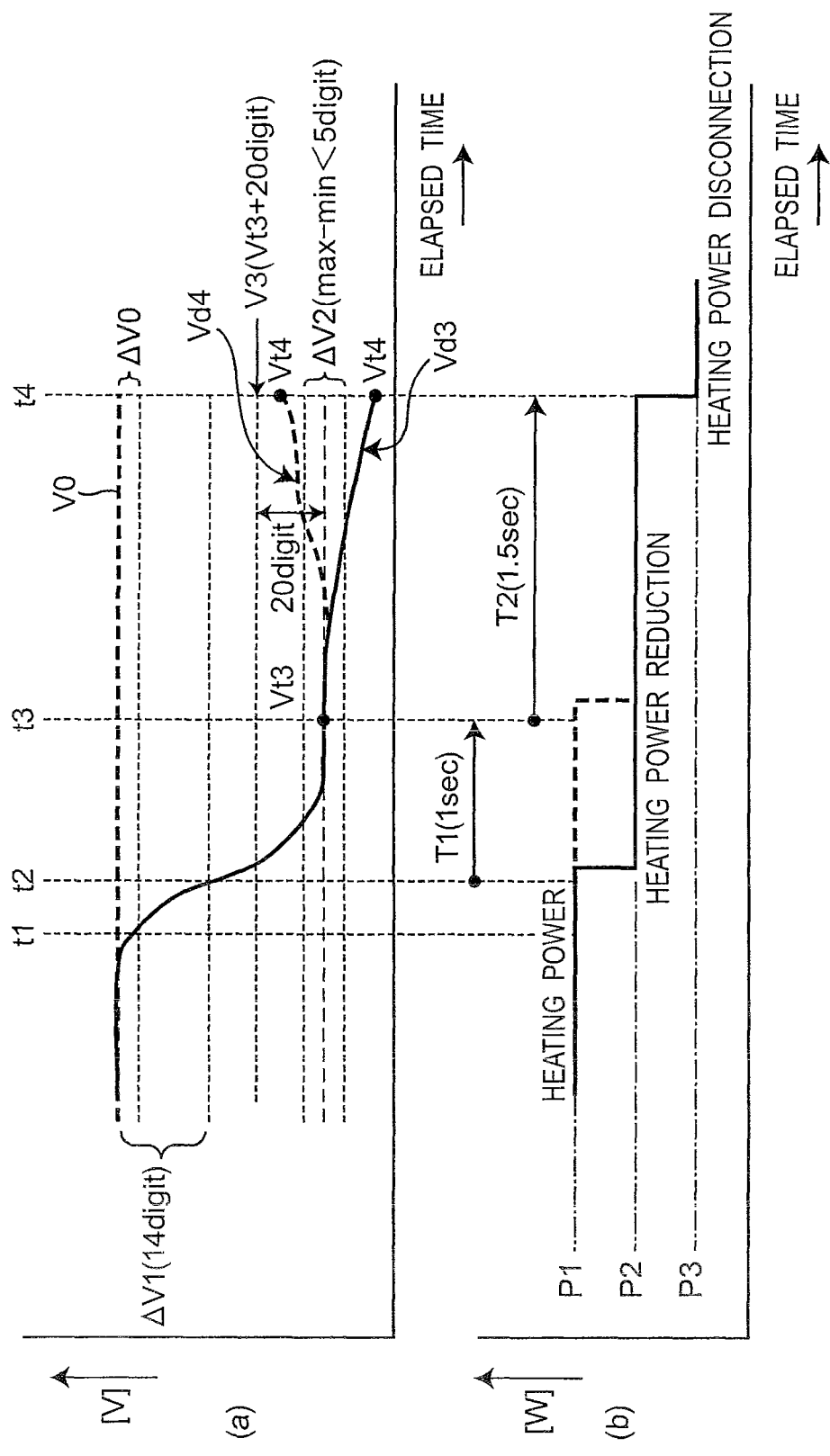
FIG. 4 is a waveform diagram showing one example of a waveform in a case where boiling over is established in determining the boiling over in the induction heating cooker in the second embodiment according to the present invention.

FIG. 4 is a waveform diagram showing one example of a waveform in a case where the boiling over is established in the boiling over determination in the induction heating cooker in the second embodiment. A longitudinal axis shows a voltage [V] of the electrostatic capacitance sensing signal Vd, and a lateral axis shows an elapsed time in (a) of FIG. 4. In addition, (b) of FIG. 4 shows a relationship between the electrostatic capacitance sensing signal Vd shown in (a) in FIG. 4 and a heating output [W] from the inverter 2.

In (a) of FIG. 4, electrostatic capacitance sensing signals Vd3 and Vd4 show two kinds of behaviors. In this case also, the electrostatic capacitance sensing signals Vd3 and Vd4 shown in (a) of FIG. 4 with respect to the reference value V0 are changed by the range of the first variation ΔV1 or more, the heating is reduced from the first heating output P1 (first set value) to the second heating output P2 (second set value). In addition, the sensed value Vt3 showing the electrostatic capacitance detected after the elapse of the boiling over determining period T1 is stored in the memory portion 12. As described above, the action until the end of the boiling over determining period T1 is the same as that of the above first embodiment.

The sensed value Vt4 of the electrostatic capacitance sensing signal Vd3 or Vd4 showing the electrostatic capacitance is compared with the third variation value V3 provided by adding the predetermined value (such as 20 digit) to the stored sensed value Vt3 after the elapse of the boiling over establishing period T2 (point t4) started after the boiling over determining period T1.

The electrostatic capacitance calculating portion 11 determines the boiling over when the sensed value Vt4 after the elapse of the boiling over establishing period T2 is less than the third variation value V3, and is out of the range of the second variation ΔV2. When the electrostatic capacitance calculating portion 11 determines the boiling over, it outputs a heating stop signal serving as a third heating output P3 (third set value) to the inverter control portion 10. In addition, the third hearting output P3 may not be the heating stop, but may be a value lower than the second heating output P2 (P3<P2<P1).

As described above, according to the induction heating cooker in the second embodiment, the second variation ΔV2 and the third variation value V3 are set based on the previous sensed value Vt3, during the boiling over establishing period T2, and the sensed value Vt4 of the electrostatic capacitance sensing signal Vd after the elapse of the boiling over establishing period T2 is compared with the second variation ΔV2 and the third variation value V3 to determine the boiling over. By determining the boiling over as described above, the induction heating cooker in the second embodiment can prevent the boiling over from being erroneously sensed.

Third Embodiment

Figure 5:
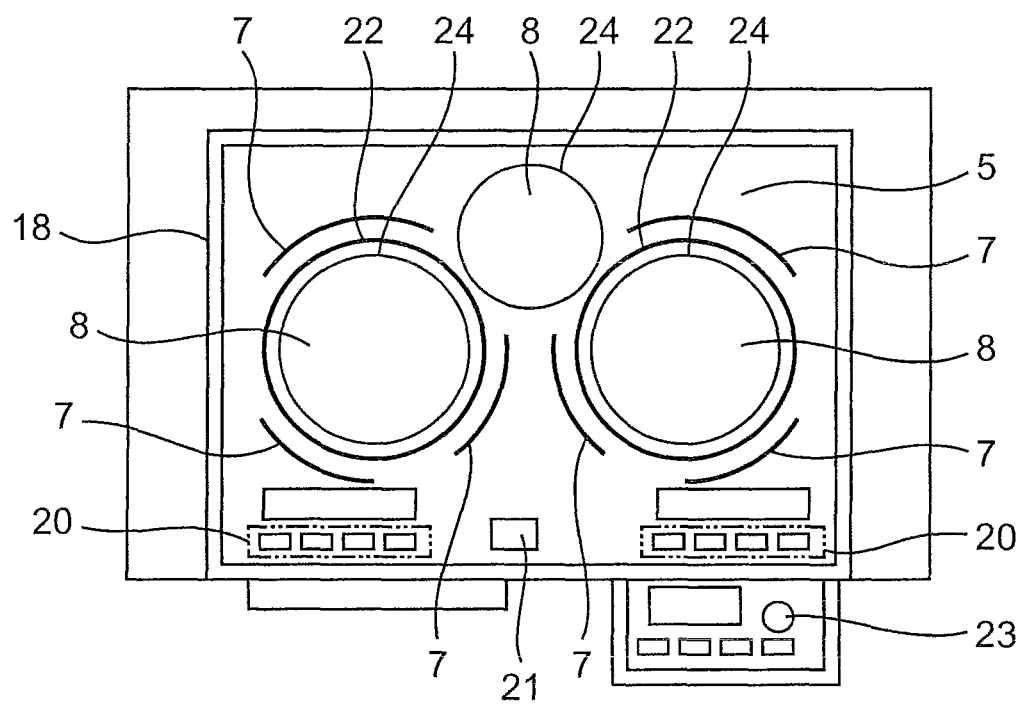
FIG. 5 is a plan view of an induction heating cooker in a third embodiment according to the present invention.
Figure 6:
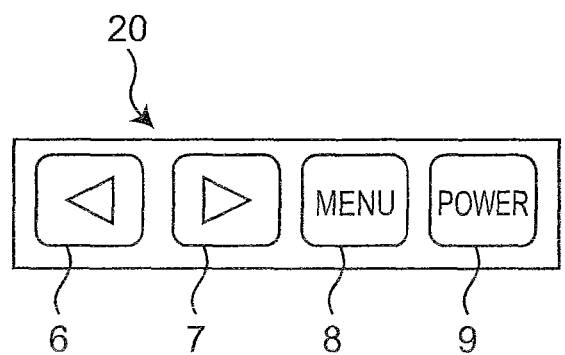
FIG. 6 is a plan view only showing an output setting portion in the induction heating cooker in the third embodiment according to the present invention.
Figure 7:
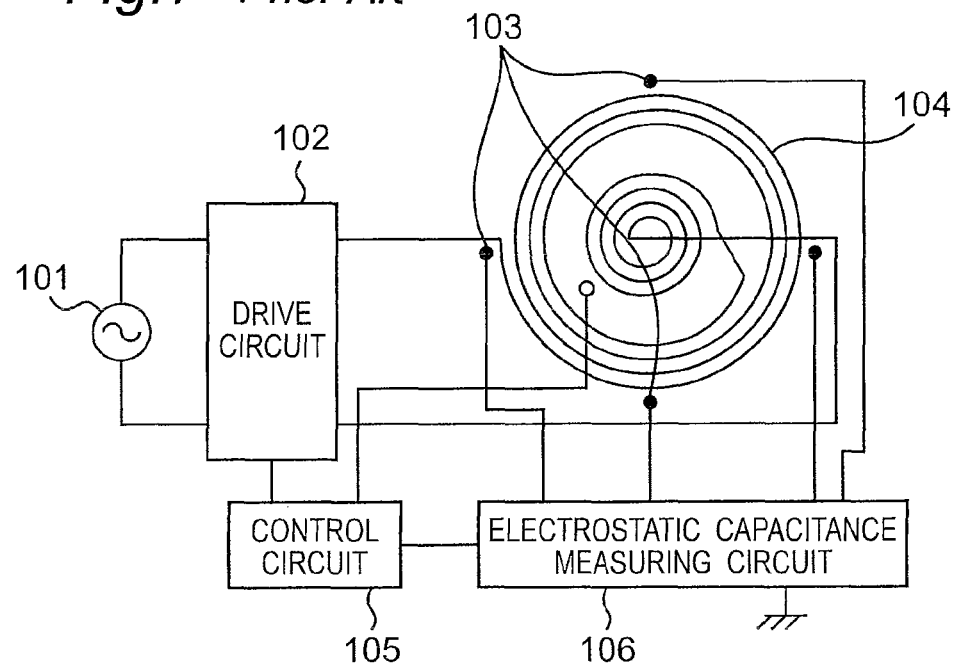
FIG. 7 is the view showing the configuration of the conventional induction heating cooker.
Figure 8:
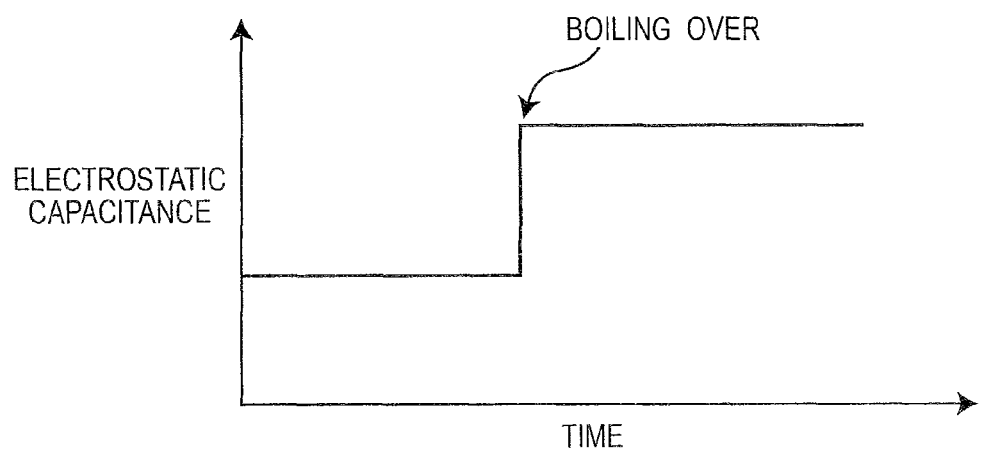
FIG. 8 is the graph showing the change in electrostatic capacitance in the electrode for sensing the boiling over in the conventional induction heating cooker.

Next, a description will be given of an induction heating cooker in a third embodiment according to the present invention with reference to accompanying FIGS. 5 and 6. FIG. 5 is a plan view of the induction heating cooker in the third embodiment. FIG. 6 is a plan view only showing an output setting portion in the induction heating cooker in the third embodiment. An external configuration of the induction heating cooker in the third embodiment which will be described below has the same configuration as that of the induction heating cookers in the above first embodiment and the second embodiment. Therefore, as for the induction heating cooker in the third embodiment, the same references signs are affixed to components which have the same function and configuration as those of the first embodiment and the second embodiment, and a detailed description is omitted. In addition, the reference signs which are described in the third embodiment are used in the first embodiment and the second embodiment.

FIG. 5 is a plan view showing the top plate 5 in the induction heating cooker in the third embodiment. On the top plate 5 shown in FIG. 5, three circle patterns 24 are drawn to display heating positions on which the cooking container (such as a pan) 6 serving as an object to be heated is set. In addition, the configuration having the three heating coils 8 will be described in the third embodiment, but the number of the heating coils 8 is not limited to three, any number such as one, two, or four of heating coils 8 may be used, and the circle patterns 24 and the electrodes 7 are formed according to the number of heating coils 8.

As shown in FIG. 5, on the top plate 5 of the induction heating cooker in the third embodiment, a plurality of operation electrodes serving as an output setting portion 20 through which a user sets an action of the induction heating cooker are printed on the back surface of the top plate 5 similar to the electrodes 7 for sensing the boiling over. A position of the output setting portion 20 is provided in a region closer to the user than the circle pattern 24 on the top plate 5.

The plurality of electrodes 7 (boiling over sensing electrodes) are formed at a predetermined distance from the circle pattern 24, near an outer side of the circle pattern 24 arranged on each side of right and left of the top plate 5, that is, near a circumference of the heating coil 8 on each side of right and left.

As shown in FIG. 5, the induction heating cooker in the third embodiment is provided with a boiling over display portion 21 for displaying a boiling over character, a heating coil display portion 22 emitting light in a shape of a ring, and a speaker 23 for generating alarm sound, in order to surely inform the user of the fact that the boiling over occurs when it is determined that the boiling over occurs.

In addition, as shown in FIG. 6, the output setting portion 20 in the induction heating cooker in the third embodiment is provided with a heat-down operation portion 6 in which a left direction is pointed with a triangle, for reducing the heating output, a heat-up operation portion 7 in which a right direction is pointed with a triangle, for increasing the heating output, a menu selecting portion 8 for setting a heating condition of the induction heating cooker, and a power supply portion 9 for turning on/off the power supply.

According to the induction heating cooker in the third embodiment, in the case where it is determined that the boiling over is sensed, the ring is shined in the heating coil display portion 22 of the heating coil 8 having the electrode 7 which sensed the boiling over, the boiling over character is lit up or blinked in the boiling over display portion 21, and the sound is generated from the speaker 23.

In addition, the induction heating cooker in the third embodiment can inform the user that the heating output has been changed although the boiling over does not occur, and that the electrostatic capacitance is fluctuated, which could occur at the time of the normal cooking, that is, it can call attention to the user. Therefore, according to the induction heating cooker in the third embodiment, the cooking can be continued without stopping the heating unless it is determined that the boiling over occurs, so that the heating cooker is improved in usability.

According to the induction heating cooker in the present invention, the boiling over is not determined based on a simple change of the electrostatic capacitance of the electrode, but the reference value is updated and stored based on the change of the detected electrostatic capacitance with time, the boiling over is determined based on the fluctuating state, the variation, and the variation value of the electrostatic capacitance during the set boiling over determining period, and the alarm is generated or the heating output is changed. According to the induction heating cooker in the present invention configured as described above, the precision in sensing the boiling over is improved, and the boiling over is prevented from being erroneously sensed, so that the cooking can be continued without unnecessarily stopping the heating.

According to the induction heating cooker in the present invention, in the case where the sensed value of the electrostatic capacitance falls within the predetermined fluctuation range after the elapse of the predetermined time starting from the change of the electrostatic capacitance, it is determined that the boiling over does not occur but determined that the pot is moved, or the top plate is touched, or the wet kitchen cloth is put on the top plate, so that the cooking action can be continued without performing the boiling over process. In addition, according to the induction heating cooker in the present invention, the boiling over can be sensed with high precision, and the flavoring liquid can be prevented from spreading on the top plate, so that the cooker can be user-friendly and improved in usability.

INDUSTRIAL APPLICABILITY

The highly-reliable induction heating cooker capable of considerably preventing the boiling over of the cooking container from being erroneously sensed during the induction cooking can be provided in the market.

The invention claimed is:
1. An induction heating cooker comprising:
a top plate configured to support a cooking container;
a heating coil under the top plate, and configured to heat the cooking container by induction;
an inverter configured to supply a high-frequency current to the heating coil;
an electrode on a back surface of the top plate in proximity to a circumference of the heating coil;
an electrostatic capacitance detecting portion configured to supply a high-frequency current to the electrode and sensing electrostatic capacitance of the electrode;
a memory portion that stores a reference value for measuring a variation of the electrostatic capacitance;
a control portion that controls an output of the inverter so that the output has a first set value set by an output setting portion; and
a boiling over detecting portion configured to switch to a second set value lower than the first set value where a sensed value of the electrostatic capacitance with respect to the reference value is in a first variation range or more, and where the output of the inverter is set at the first set value,
wherein the boiling over detecting portion returns the output of the inverter to the first set value where the sensed value is within a second variation range during a boiling over establishing period set after the sensed value is within the first variation range or more and subsequently transitions to within the second variation range, where the second variation range is lower than the first variation range.

2. The induction heating cooker according to claim 1, wherein the boiling over detecting portion
performs a reference value updating process to replace the reference value with the electrostatic capacitance sensed after elapse of a reference value sensing period, after a state in which the sensed value of the electrostatic capacitance falls within a range of a reference value update variation smaller than the first variation has continued for the reference value sensing period, and
prohibits the reference value updating process where the variation is within the reference value update variation or more,
returns the output of the inverter to the first set value, and
resume the reference value updating process where the sensed value in the boiling over establishing period set, after the reference value updating process is prohibited, falls within the second variation range.

3. The induction heating cooker according to claim 1, wherein the boiling over detecting portion counts a time of the boiling over establishing period after elapse of a boiling over determining period started after the sensed value of the electrostatic capacitance is within the first variation range or more.

4. The induction heating cooker according to claim 1, wherein the memory portion also stores a maximum value of the sensed value of the electrostatic capacitance during the boiling over establishing period, and it is determined whether or not the maximum value falls within the range of the second variation by comparing the maximum value with the range of the second variation.

5. The induction heating cooker according to claim 1, wherein the boiling over detecting portion is configured to return the output of the inverter to the first set value after the boiling over establishing period and where the sensed value of the electrostatic capacitance is within the second variation range or more, and has a variation value or more set by adding a predetermined value to the sensed value of the electrostatic capacitance after the elapse of the boiling over determining period, during the boiling over establishing period.

6. The induction heating cooker according to claim 1, wherein the boiling over detecting portion stops a heating action of the inverter or reduces the output of the inverter to a third set value lower than the second set value after the boiling over establishing period and where the sensed value of the electrostatic capacitance is within the second variation range or more, and is less than a variation value set by adding a predetermined value to the sensed value of the electrostatic capacitance after the elapse of the boiling over determining period, during the boiling over establishing period.

7. The induction heating cooker according to claim 1, further comprising an alarm portion, wherein the control portion controls the alarm portion to generate an alarm when the boiling over is sensed.

8. The induction heating cooker according to claim 2, wherein the boiling over detecting portion counts a time of the boiling over establishing period after elapse of a boiling over determining period and where the sensed value of the electrostatic capacitance is within the second variation range or more.

* * * * *